(12) United States Patent  (10) Patent No.: US 8,783,603 B2
Regas et al.  (45) Date of Patent: Jul. 22, 2014

(54) AIRSHIP

(75) Inventors: Baptiste Regas, Nantes (FR); Olivier Jozan, Nantes (FR)

(73) Assignee: A-NTE (Aero-Nautic Technology & Engineering), Montrouge (FR)

( * ) Notice: Subject to any disclaimer, the term of this patent is extended or adjusted under 35 U.S.C. 154(b) by 0 days.

(21) Appl. No.: 13/500,744

(22) PCT Filed: Oct. 12, 2010

(86) PCT No.: PCT/FR2010/052161
§ 371 (c)(1),
(2), (4) Date: Apr. 6, 2012

(87) PCT Pub. No.: WO2011/045529
PCT Pub. Date: Apr. 21, 2011

(65) Prior Publication Data
US 2012/0199693 A1  Aug. 9, 2012

(30) Foreign Application Priority Data
Oct. 14, 2009 (FR) ........................................ 09 57179

(51) Int. Cl.
*B64B 1/06* (2006.01)

(52) U.S. Cl.
USPC ............................................. 244/30; 244/24

(58) Field of Classification Search
USPC .................... 244/30, 31, 24, 100 R, 105, 115
See application file for complete search history.

(56) References Cited

U.S. PATENT DOCUMENTS

| 1,350,211 | A | * | 8/1920 | Corson, Jr. ........................ 244/94 |
| 1,663,645 | A | * | 3/1928 | Auberlin ......................... 244/115 |
| 1,949,304 | A | * | 2/1934 | Hardin ............................... 244/2 |
| 2,061,075 | A |   | 11/1934 | Jelalian |
| 2,131,155 | A |   | 11/1935 | Waller |
| 4,089,492 | A | * | 5/1978 | Lang ................................ 244/30 |
| 5,516,065 | A | * | 5/1996 | Hagenlocher ................ 244/115 |
| 7,350,746 | B2 | * | 4/2008 | Gili et al. ......................... 244/30 |
| 2008/0011900 | A1 | * | 1/2008 | Quintana ......................... 244/30 |
| 2009/0078818 | A1 | * | 3/2009 | Zulkowski et al. ............ 244/30 |

FOREIGN PATENT DOCUMENTS

| DE | 19911617 A1 | 3/1999 |
| EP | 1 292 474 | 6/2001 |
| EP | 1 451 063 | 12/2002 |
| FR | 2 628 061 | 3/1988 |
| FR | 2 706 151 | 6/1993 |
| FR | 2 747 641 | 4/1996 |
| GB | 2216482 | 2/1999 |

OTHER PUBLICATIONS

French Search Report from corresponding French Patent Application No. FR 0957179 Report Dated May 17, 2010.
International Search Report from corresponding International Patent Application No. PCT/FR2010/052161 Report Dated Feb. 2, 2011.

* cited by examiner

*Primary Examiner* — Tien Dinh
*Assistant Examiner* — Jessica Wong
(74) *Attorney, Agent, or Firm* — Miller, Matthias & Hull LLP

(57) ABSTRACT

The invention relates to an airship including a flexible envelope having no rigid inner structure containing a gas that is lighter than air, and a gondola. The balloon also includes three legs for setting the balloon on the surface and a landing structure. The landing structure is located on the outside of the envelope, and provides a connection between the legs, the gondola and the envelope while surrounding the envelope.

11 Claims, 5 Drawing Sheets

AIRSHIP

CROSS-REFERENCE TO RELATED APPLICATIONS

This application is a 35 USC §371 U.S. national stage filing of International Patent Application No. PCT/FR2010/052161 filed on Oct. 12, 2010, which claims priority under the Paris Convention to French Patent Application No. 09 57179, filed on Oct. 14, 2009.

FIELD OF THE DISCLOSURE

The present invention relates to airships.

BACKGROUND OF THE DISCLOSURE

More particularly, the invention relates to an airship intended to fly through the air and to be set down on a solid or liquid surface, comprising:

a flexible envelope with no rigid internal structure and containing a gas lighter than air, said envelope being elongated substantially along a longitudinal axis between a nose situated toward the front of said airship and a tail situated toward the rear of said airship, and comprising an upper part and a lower part, and a gondola connected to the lower part of the envelope between the nose and the tail.

Numerous examples of airships of this "non-rigid" type, which means of the type having a flexible envelope, are known. Document FR-A-2 628 061 describes one example of such an airship.

With this type of airship, the connection between the gondola and the flexible envelope is not strong enough to lift the gondola. This is because the gas contained in the flexible envelope exerts a lift force which is distributed over the surface of the upper part of the envelope. The gondola is therefore suspended from this upper part of the envelope by cables that pass right through the envelope.

Furthermore, airships of this type need a landing zone comprising a mooring mast aimed at holding the airship near the surface of the ground. Thus, in a crosswind, the airship naturally revolves about the mast like a wind vane until its nose is facing into the wind. These mooring masts are expensive and have to be firmly anchored into the ground.

When such an airship lands, a great many people are needed to stabilize it near the mast, to moor it to the mast by running at least one line between the airship, the top of the mast and the ground in order to bring the nose of the airship up close to the top of the mast, and also around the airship in order to add ballast and assist with stabilizing it near the surface of the ground.

"Rigid" or "semi-rigid", airships are also known, like those described in U.S. Pat. No. 1,949,304, U.S. Pat. No. 1,350,221, U.S. Pat. No. 2,131,155 or U.S. Pat. No. 2,061,075.

However, these other types of airship are complicated to produce, are heavy and are therefore expensive and inefficient.

SUMMARY OF THE DISCLOSURE

It is an object of the present invention to improve airships of the non-rigid type, notably to improve the connection between the gondola and the flexible envelope, and to avoid having to resort to this equipment and personnel on the landing zone.

To this end, the airship is characterized in that it further comprises:

at least three feet spaced horizontally apart and designed for setting the airship down on the surface, and a landing structure situated on the outside of the envelope connecting together the feet, the gondola and the envelope, said landing structure comprising a reinforcing structure at least partially surrounding said envelope thereby delimiting a first and a second side, the envelope comprising a first surface on the first side and a second surface on the second side, the first and second surfaces of the envelope being flexible and in contact with a flow of the air through which the airship is intended to fly.

Thanks to these measures, such an airship can be set down stably on the surface without having need for equipment, such as a mooring mast, or for any personnel in the landing zone. Such an airship is therefore autonomous. It can set down anywhere, on land, at sea, or on a lake.

This airship has a lightweight landing structure that is easy to produce.

It is therefore inexpensive to produce and to operate.

In various embodiments of the airship according to the invention, recourse may further be had to one and/or another of the following measures:

the landing structure further comprises:
  a reinforcing structure partially surrounding the envelope and connected on the outside to the envelope by means of attachment, so as to support and hold the envelope of the airship in the landing structure, and
  crossmembers connecting the gondola to said reinforcing structure;

the reinforcing structure has a shape chosen from an annular shape, a semi-annular shape and a curved shape;

the reinforcing structure comprises at least one first portion above a horizontal median plane passing through the longitudinal axis and a second portion below said plane;

the first portion is near the nose of the envelope;

the reinforcing structure is made up of a curved beam produced as a single piece;

the means of attachment apply force to the envelope in order to control a profile of the envelope at least near the reinforcing structure in order to maintain good penetration of the flexible envelope through the air when the airship is moving forward in flight;

the reinforcing structure is constructed using at least one of the materials from a list comprising aluminum, carbon, magnesium, titanium, steel, fiberglass, a synthetic material, a polymer, wood;

the landing structure further comprises arms each extending downward from a first end fixed to the reinforcing structure as far as a second end, each second end comprising one of said feet designed for setting the airship down on the surface;

the airship further comprises a mooring cable designed to extend forward between a nose portion of the reinforcing structure and a substantially fixed mooring point of the surface designed to hold the airship near the mooring point when said airship is set down on the surface, and at least one of the arms is inclined forward from the reinforcing structure in order to resist a pulling force in the mooring cable;

the airship further comprises a mooring cable designed to extend between at least one point on the landing structure and a substantially fixed mooring point on the surface designed to hold the airship near the mooring point when said airship is set down on the surface;

the airship further comprises a longitudinal arm extending substantially horizontally from the gondola toward the nose and a mooring cable designed to extend between at least one distal end of the longitudinal arm and a substantially fixed mooring point on the surface designed to hold the airship near the mooring point when said airship is set down on the surface;

each foot is equipped with at least one wheel designed so that the airship can be set down and moved substantially horizontally on a solid surface, and the feet are situated vertically downward under the gondola;

the gondola comprises a pan and a pickup means designed to pick up material from the surface and convey it into the pan, in order to ballast said airship;

each foot is equipped with a float designed so that the airship can be set down on a liquid surface;

the gondola comprises a reservoir and a pump designed to fill said reservoir when the airship is set down on or in near-hovering flight over a liquid surface, in order to ballast said airship;

the airship further comprises a plurality of orientable propulsion units, and in which at least one of the propulsion units is orientable about two control axes mounted in series, one after the other, so that said propulsion unit can be oriented in any direction;

each foot is equipped with a reservoir designed to be at least partially filled when the airship is set down on or in near-hovering flight over a surface, in order to ballast said airship;

at least one foot is also equipped with a float;

the rear foot and the gondola are fitted with floats;

the front feet situated laterally with respect to a longitudinal axis of the envelope are each connected to the landing structure by a cable in order to hold the reservoirs of the front feet in a substantially vertical direction;

the landing structure further comprises front arms connecting each of said front feet to the gondola;

the front arms can be folded in a direction substantially parallel to the longitudinal axis when the airship is in flight, and can be deployed laterally when the airship is either ready to be set down on the surface or held in near-hovering flight over the surface.

BRIEF DESCRIPTION OF THE DRAWINGS

Other features and advantages of the invention will become apparent during the course of the following description of three embodiments thereof which are given by way of non-limiting example with reference to the attached drawings.

In the drawings.

DETAILED DESCRIPTION OF THE DISCLOSURE

In the various figures, the same references denote elements that are identical or similar.

The forward direction mentioned in this description is to be understood as meaning the direction extending in the X direction denoted in the figures. The rearward direction is therefore in the opposite direction. Similarly, the top or an upper part mentioned is to be understood as being the Z direction denoted in the figures. These directions are given only to make the invention easier to read and to understand.

Figure 1:
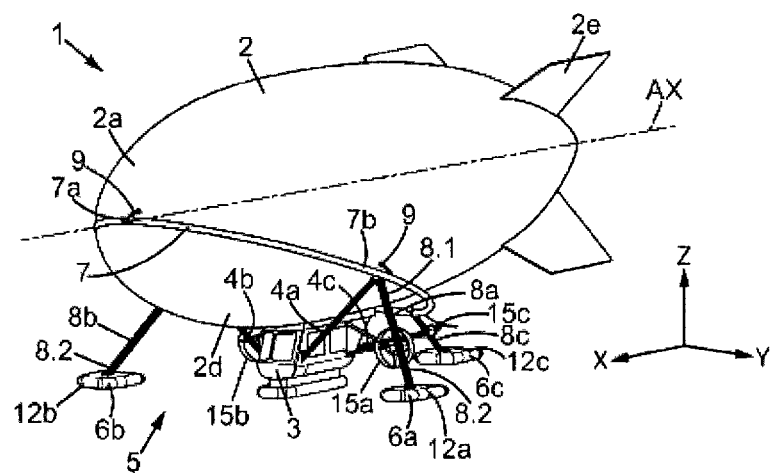
FIG. 1 is a perspective view of an airship according to a first embodiment of the invention.
Figure 2:
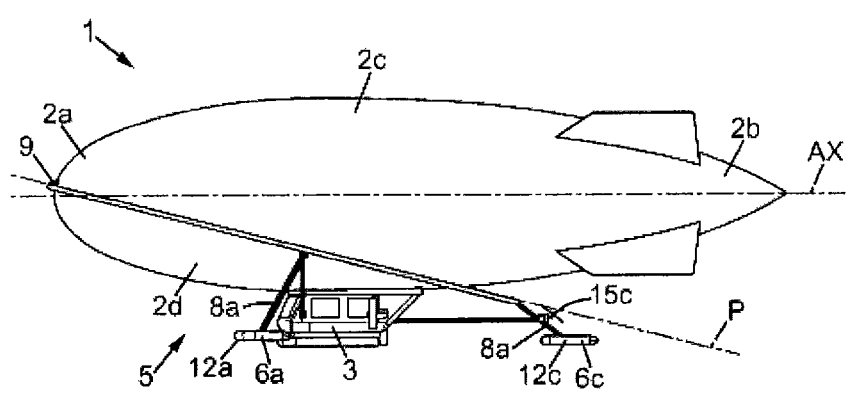
FIG. 2 is a side view of the airship of FIG. 1.
Figure 3:
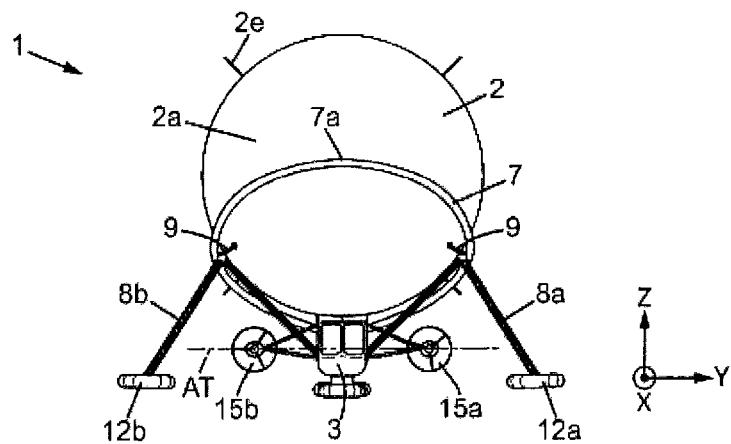
FIG. 3 is a front view of the airship of FIG. 1.

As can be seen in FIGS. 1 to 3, the airship 1 comprises:

a flexible envelope 2 with no rigid internal structure and which contains a gas lighter than air, a gondola 3 intended to transport, for example, a pilot.

The envelope 2 is elongate substantially along a longitudinal axis AX between a nose 2a situated toward the front of said airship and a tail 2b situated toward the rear of said airship. The tail 2b comprises ailerons or an empennage 2e designed to provide the airship with stability in the direction of forward flight. The flexible envelope 2 comprises, toward the top (above a substantially horizontal plane passing through the longitudinal axis AX), an upper part 2c and, toward the bottom (below the horizontal plane passing through the axis AX), a lower part 2d.

The empennage 2e comprises elevator and rudder control surfaces and the envelope 2 comprises ballonets that can be inflated with air for maneuvering the airship.

The gondola 3 is connected to the lower part 2d of the envelope between the nose 2a and the tail 2b.

The airship 1 further comprises at least three feet 6a, 6b, 6c spaced horizontally apart. These feet 6a, 6b, 6c are designed for setting the airship 1 down on the surface of the landing zone.

The airship 1 further comprises a landing structure 5 situated on the outside of the envelope 2 and connecting together the feet (6a, 6b, 6c), the gondola 3 and the envelope 2, while partially surrounding said envelope (2) over a section that intersects the longitudinal axis AX.

According to a first embodiment of the airship 1 shown in FIGS. 1 to 5, the landing structure 5 comprises:

a reinforcing structure 7 of annular shape extending from the nose 2a and partially surrounding the lower part 2d of the envelope 2, a first crossmember 4a extending between the gondola 3 and the reinforcing structure 7 on a first lateral side of the airship 1, a second crossmember 4b extending between the gondola 3 and the reinforcing structure 7 on a second lateral side of the airship 1, the opposite side to the first lateral side, a third crossmember 4c extending rearward between the gondola 3 and a rear arm 8c connecting the reinforcing structure 7 to the third foot 6c, and arms 8a, 8b, 8c each extending downward from a first end 8.1 fixed to the reinforcing structure 7 as far as a second end 8.2, each second end 8.2 comprising one of said feet 6a, 6b, 6c designed for setting the airship down on the surface.

More specifically, the landing structure 5 comprises, in the figures:

a first and a second front arm 8a, 8b, which arms are situated on one lateral side of the reinforcing structure 7 in a front portion, in front of the gondola 3, and a third arm 8c situated at the rear of the reinforcing structure 7, behind the gondola 3.

The landing structure 5 may potentially comprise other crossmembers between these elements in order to stiffen said structure.

As an alternative, the front arms 8a, 8b may be articulated so that they can be folded from a landing position depicted into a flight position in which they extend in a direction substantially parallel to the longitudinal axis AX, the feet 8a, 8b then being brought in closer to the envelope 2 of the airship.

In FIGS. 1 to 3, the reinforcing structure 7 has a substantially elliptical annular shape, but this reinforcing structure 7 external to the envelope 2 may be formed in a curved loop closed up on itself, or as a circular shape, or may have a semi-annular shape like a beam curved in such a way that it partially surrounds the envelope 2. This reinforcing structure 7 is similar to a sailboard "wishbone" surrounding the sail.

The reinforcing structure 7 is, for example, contained in a plane P (see FIG. 2) inclined downward with respect to the longitudinal axis AX and toward the rear of the airship. Thus, the reinforcing structure 7 partially envelops the lower part 2d of the envelope 2 and the arms 8a, 8b, 8c are of short length. The reinforcing structure 7 may for example be curved upward toward the front of the airship when viewed from the side, as in FIG. 2, in order further to reduce the lengths of the arms 8a, 8b, 8c and improve their mechanical strength.

The reinforcing structure 7 may be produced as a curved beam produced as a single piece.

The reinforcing structure 7 and all the components of the landing structure 5 need to be lightweight and mechanically strong. For example, these elements can be made of aluminum or of carbon. In particular, the annular reinforcing structure 7 may be produced in a similar way to a mast of a boat. Alternatively, magnesium, wood, steel or any combination of the above materials may be used.

A cross section of the reinforcing structure 7 or of the arms 8a, 8b, 8c may advantageously be profiled in the direction of the longitudinal axis AX in order to reduce the aerodynamic drag of these components. This cross section does not necessarily have to be constant along the structure.

The reinforcing structure 7 is connected to the envelope 2 by means of attachment 9 at least in a nose portion 7a of the reinforcing structure near the nose and in another portion 7b of the reinforcing structure situated on the side of the airship, for example situated toward the rear near the gondola 3, in order to support the envelope 2 of the airship 1.

These means of attachment 9 for example comprise cables or tension chords which exert tensile forces on an attachment element fixed to the envelope 2 in order to control the profile of the envelope 2 at least near the reinforcing structure 7. The attachment element for example comprises a mount designed to be fixed to a surface portion of the envelope 2 in order to spread the load, and a ring secured to said mount and through which at least one of said tension cables can be fed. The mount may be a disk of fabric extending at a radius around the ring, said disk of fabric itself being able to have stiffening spokes.

As an airship moves forward in flight, its nose experiences significant rearward aerodynamic forces along the longitudinal axis AX. These aerodynamic forces have a tendency not only to slow the movement of the airship but also to deform the nose 2a of its envelope. Above a certain speed, the nose becomes flattened, and this has the effect of increasing the aerodynamic forces and of amplifying the phenomenon. This problem is particularly troublesome in a non-rigid airship. Thus, thanks to the reinforcing structure 7 and to the means of attachment 9, the envelope 2 is forced to maintain a profile near the reinforcing structure 7, in a direction substantially along the longitudinal axis AX. This prevents the flattening of the nose 2a of the envelope 2 when the airship 1 moves forward in flight. Thus, the penetration of the flexible envelope 2 through the air is maintained or preserved.

As an alternative, it is equally possible for these means of attachment 9 to be controlled from the gondola 3 of the airship. For example, the tensile forces can be modified, increased or reduced to suit the parameters of flight: speed, altitude, ascent, descent, turning. Thus, the profile and tension of the envelope can be controlled to make flying easier.

An airship is usually extremely sensitive to crosswinds. The envelope 2 has a tendency to deform and the airship has a tendency to rock. The reinforcing structure 7 allows the envelope 2 to be held in position and the lateral front arms 8a, 8b give the airship 1 greater stability in a crosswind.

An airship of the prior art, moored in the mooring zone using a mast, revolves about the mast in the wind. Sometimes the airship strikes the mast or a nearby object: such accidents are not infrequent and are often fatal for the airship, especially for an airship of the non-rigid type. The reinforcing structure 7 of the airship 1 protects the flexible envelope 2 from contact at least in the lateral and longitudinal directions toward the front.

The flexible envelope 2 of the airship 1 means that an airship can be built inexpensively and which is lightweight, and the landing structure 5 is able to stabilize and protect such an airship.

The airship 1 further comprises a mooring cable 10 designed to extend forward between said nose portion 7a of the reinforcing structure 7 and a substantially fixed mooring point 11 on the surface designed to hold the airship near the mooring point 11 when said airship 1 is set down on the surface.

Figure 4:
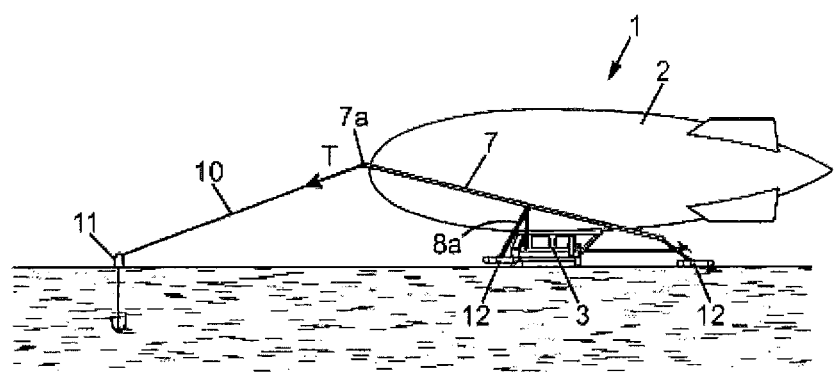
FIG. 4 is a side view similar to FIG. 2 showing how it is moored at the surface.

The mooring cable 10 in this position exerts a forward tensile force T on the nose of the airship 1, as depicted in FIG. 4.

The front arms 8a, 8b are therefore inclined forward from the reinforcing structure 7 in order better to withstand this tensile force and keep the airship 1 suitably stable.

As an alternative, the mooring cable 10 may extend forward between the gondola 3 or any element of the landing structure 5 and the mooring point 11, it still exerting a forward tensile force on the airship, particularly when there is a headwind.

Figure 5:
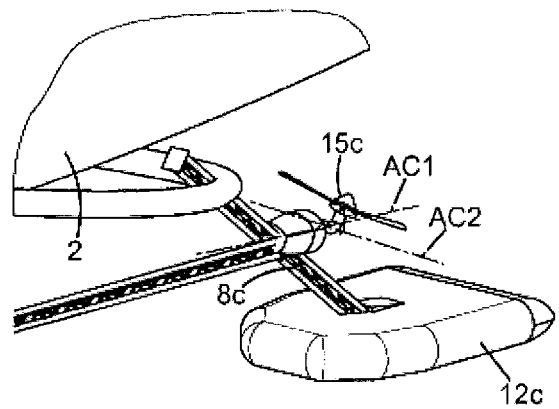
FIG. 5 is a detailed view of the rear propulsion unit of the airship of FIG. 1.

The airship 1 also comprises:

a first and a second propulsion unit 15a, 15b laterally run on each side of the gondola 3, these propulsion units being articulated to rotate about a transverse axis AT substantially perpendicular to the longitudinal axis AX, and a third propulsion unit 15c situated at the rear of the airship, for example on the rear arm 8c, said third propulsion unit 15c itself being articulated to rotate about two control axes AC1, AC2 in series, perpendicular to one another and offset from one another so that this third propulsion unit can generate a propulsion force in more or less any direction (FIG. 5). The third propulsion unit 15c may for example be articulated by an automated arm 16 or any other equivalent device.

The propulsion units are fitted with pivoting propellers driven by one or more engines.

The first and second propulsion units 15a, 15b are designed to generate the propulsion force in order to cause the airship 1 to move forward in cruising flight. Articulating them about the transverse axis AT allows them to be oriented either to assist with takeoff or, conversely, to assist with landing.

The third propulsion unit 15c is situated near the tail is itself, depending on the orientation given to the pair of axes, able to cause the airship 1 to turn about a substantially vertical axis like a helicopter or compensate for a longitudinal pitching moment in order to stabilize the airship 1 in hovering flight.

Thanks to all of these propulsion units (15a, 15b, 15c) the airship 1 is particularly easy to maneuver, particularly in hovering flight and in phases of landing or takeoff flight.

The airship 1 of the invention can land:
either on liquid surfaces, for example at sea or on a lake,
or on solid surfaces, on land, for example at an aerodrome or in a field.

In the former instance of an airship designed to land on a liquid surface, each foot 6a, 6b, 6c of the airship 1 is fitted with a float 12a, 12b, 12c. The mooring cable 10 is for example fitted at its end with an anchor and, at a predetermined length, with a buoy.

When the airship 1 makes a sea landing, the pilot pays out the mooring cable 10 such that the anchor sinks down into the sea and the buoy floats on the surface at a spot known as the mooring point 11, he touches down near the buoy on his floats 12, and reverses back from this buoy. The action of the wind on the envelope 2 of the airship will naturally blow the airship away from this buoy, tension the mooring cable 10 between the nose portion 7a and the buoy, and orient the longitudinal axis AX of the airship 1 in the direction of the wind, facing into the wind. When the wind changes direction, the airship then turns through some distance about the buoy.

As an alternative, the mooring cable 10 is fitted at its end with an anchoring means designed to be secured to a buoy already present on the liquid surface. When the airship 1 touches down, the pilot brings the airship closer to the buoy, secures the anchoring means to the buoy, and touches down nearby on its floats. The remainder of the maneuver is the same. The anchoring means may potentially be a ring designed to fit around the buoy and to tighten as the airship 1 moves away from the buoy and a tensile force in the mooring cable 10 increases.

The gondola 3 may further comprise a reservoir 3a and a pump. Once the airship has touched down on the water, the pilot actuates a control of the pump in order to fill the reservoir of the gondola 3. In this way, the airship 1 is autonomously ballasted and the stability of said airship is increased.

In the latter instance of an airship designed to land on a solid surface, each foot 6a, 6b, 6c of the airship 1 is fitted with a wheel to rest on the ground. The wheels may potentially be orientable about a substantially vertical axis. The gondola 3 is therefore at a predetermined height of the surface of the ground. The mooring cable is, for example, fitted at its end with a hook or with a grapple.

When the airship 1 lands, the pilot pays out the mooring cable 10 such that the grapple attaches itself to a mooring point 11 on the surface of the ground, he lands near said mooring point 11 on his wheels, and reverses back from this point. The action of the wind on the envelope 2 of the airship will then naturally move the airship away from the mooring point, tension the mooring cable 10 between the nose portion 7a and the mooring point 11, and orient the longitudinal axis AX of the airship 1 in the direction of the wind, facing into the wind. When the wind changes direction, the airship then turns through some distance about the mooring point 11.

The gondola 3 may further comprise a reservoir 3a or pan and a pickup means designed to pick up a material from the surface of the ground and convey it into the pan 3a. Once the airship has landed, the pilot actuates a control of this pickup means in order to fill the pan 3a of the gondola 3. In this way, the airship 1 is autonomously ballasted and the stability of said airship is increased.

The pickup means may, for example, be a small mechanical shovel fitted with a bucket or a gripper, an endless screw designed to dig a hole under the gondola 3 and raise a material extracted out of the ground.

Depending on the nature of the ground, the material may be earth, sand or gravel. The pickup means may be adapted or chosen according to the nature of the material on the surface of the ground.

The two foot equipments mentioned may be combined. Each foot 6a, 6b, 6c of the airship 1 may be fitted with a float and with a wheel protruding underneath the float. The feet may also be fitted with any other means suited to setting down on the surface.

The gondola 3 of the airship may comprise several means for ballasting it, notably a pump for filling a reservoir and a pickup means. Such an airship 1 can then touch down at sea or on land, autonomously without an installation, such as a mooring mast, and without any personnel in the landing zone.

The ballasting means can be used not only during landing. Indeed, on long journeys, the weight of the gondola decreases as the propulsion units use up fuel. The airship 1 can therefore periodically come down closer to the surface and place itself in a near-hover for a short while in order to compensate for this loss of weight. In particular, fitting it with a reservoir and with a pump allows sea crossings to be made.

Figure 6:
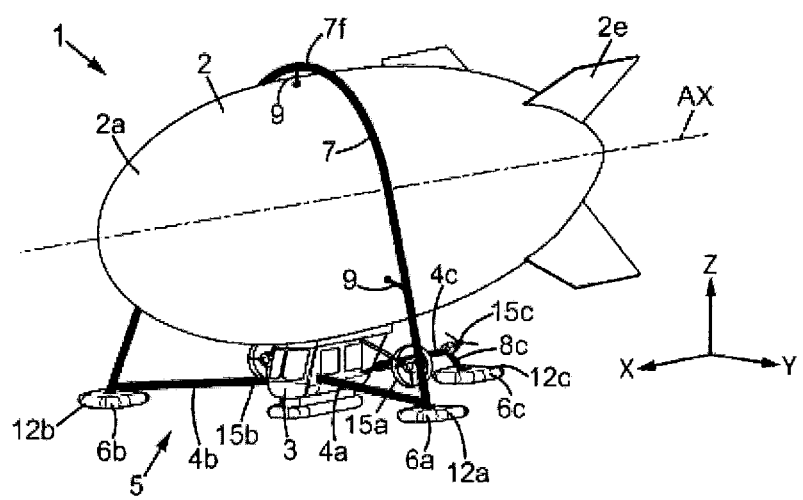
FIG. 6 is a perspective view of an airship according to a second embodiment of the invention.
Figure 7:
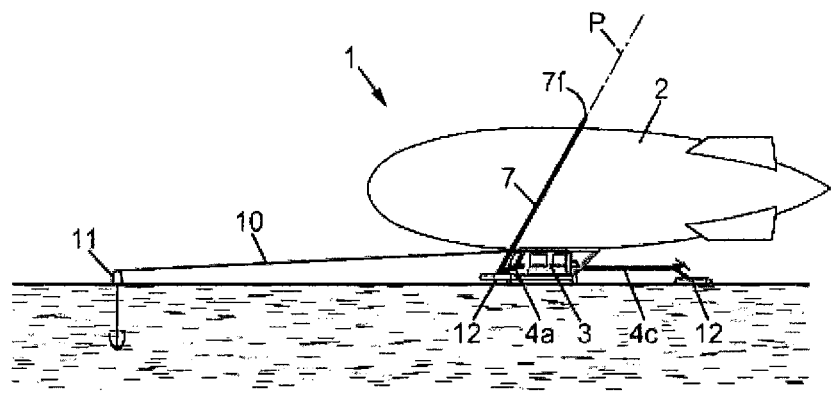
FIG. 7 is a side view of FIG. 6 showing how it is moored to the surface.

According to a second embodiment of the invention, depicted in FIGS. 6 and 7, the landing structure 5 comprises:
a reinforcing structure 7 in the form of a bow extending upward from a first front foot 6a as far as an extreme upper portion 7f above the envelope 2, then extending from this extreme portion 7f downward as far as the second front foot 6b, and
a first crossmember 4a extending between the gondola 3 and the first front foot 6a,
a second crossmember 4b extending between the gondola 3 and the second front foot 6b, and
a third crossmember 4c extending between the gondola 3 and the third foot 6c situated at the rear of the airship.

The reinforcing structure 7 is connected to the envelope 2 by at least one means of attachment. FIG. 6 shows such a means of attachment 9 between the extreme upper portion 7f of the reinforcing structure 7 and the envelope 2, and another means of attachment 9 at an intermediate portion and connected to the side of the envelope 2.

Thanks to this measure, the envelope 2 is surrounded by the landing structure 5 and firmly held therein.

Further, as depicted in FIG. 7, the mooring cable 10 of this embodiment extends forward from the gondola 3 or one of the or the crossmembers 4a, 4b and a mooring point 11 when the airship 1 is set down on the surface. The mooring cable 10 again in this position applies a tensile force T toward the front.

Figure 8:
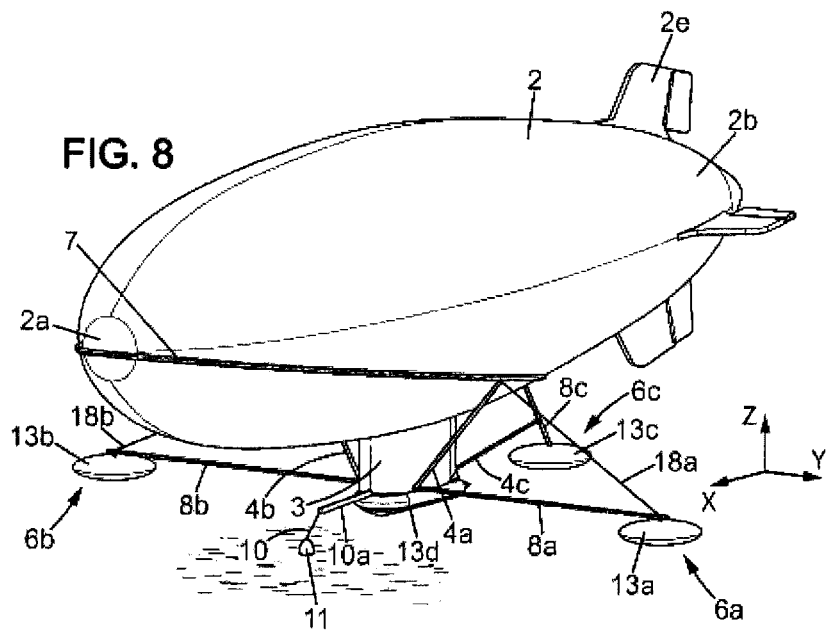
FIG. 8 is a perspective view of an airship according to a third embodiment of the invention.
Figure 9:
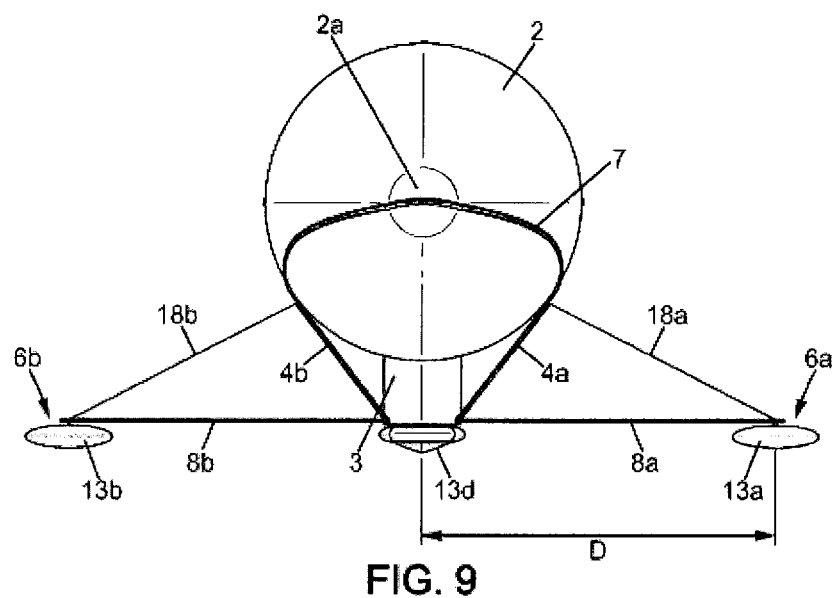
FIG. 9 is a front view of the airship of FIG. 8.

According to a third embodiment of the invention, shown in FIGS. 8 and 9, the landing structure 5 comprises:
a reinforcing structure 7 of annular shape extending from the nose 2a and partially surrounding the lower part 2d of the envelope 2,
a first crossmember 4a extending between the gondola 3 and the reinforcing structure 7 on a first lateral side of the airship 1,
a second crossmember 4b extending between the gondola 3 and the reinforcing structure 7 on a second lateral side of the airship 1, the opposite side to the first lateral side,
a third crossmember 4c extending rearward between the gondola 3 and a rear arm 8c connecting the reinforcing structure 7 to the third foot 6c, and
a rear arm 8c extending downward from a first end 8.1 fixed to the reinforcing structure 7 as far as a second end 8.2, the second end 8.2 comprising one of the feet 6c designed for setting the airship down on the surface.

The landing structure 5 comprises front arms 8a, 8b which differ from the first embodiment of the invention in that they extend substantially horizontally between a first end fixed to the gondola and a second end comprising a front foot 6a, 6b. These front feet 6a, 6b are situated laterally on each side of the airship 1 with respect to the longitudinal axis AX. Together with the rear foot 6c, they allow the airship to be set down on the surface.

The front feet 6a, 6b are laterally separated by a distance D from the gondola 3 by front arms 8a, 8b.

Each front foot 6a, 6b is fitted with a reservoir 13a, 13b instead of the floats 12a, 12b for setting the airship down on a liquid surface. These reservoirs can be filled with or emptied of liquid using a pump in order to ballast the airship.

Each reservoir 13a, 13b can be immersed under the surface and raised up using a cable 18a, 18b that connects it to the reinforcing structure 7, for example near the point of attachment of a crossmember 4a, 4b to the reinforcing structure 7.

These reservoir cables 18a, 18b are therefore designed for lowering the reservoirs below the liquid surface and for raising said reservoirs up above the liquid surface.

The rear foot 6c and the gondola 3 are also fitted with reservoirs 13c, 13d. They are also possibly fitted with floats 12c, 12d.

The operation of this embodiment is therefore the opposite of the operation of the previous embodiments of the invention.

In the previous embodiments, as the airship touches down on the water, the airship has a lift (upward force applied by the lighter-than-air gas contained in the envelope) that is weaker than its weight (downward force of attraction). The floats 12a, 12b, 12c compensate for the negative difference between lift and weight so that the airship 1 remains set down on the liquid surface.

In the third embodiment, when the airship 1 touches down on the water, the pilot still has more lift than weight. The reservoirs compensate for the positive difference between lift and weight so that the airship remains set down on the liquid surface.

When the airship 1 touches down on the water, the front reservoirs 13a, 13b are immersed under the surface and filled with liquid. The cables 18a, 18b are then actuated to raise or lift said reservoirs 13a, 13b at least partially above the surface. This generates an additional downward force corresponding to the weight of the liquid moved above the surface, said additional force being equal to the magnitude of the positive difference and having the effect of "sticking" the airship 1 to the surface. The airship is thus set down on the surface very stably.

When the airship 1 is subjected to a crosswind, this wind applies a significant force to the surface of the envelope 2 on the side from which the wind is blowing, and tends to cause it to rock toward the downwind side. In this case, it is possible for the reservoir of the front arm on the windward side to be raised up even higher. In this way, the cables 18a, 18b exert forces of different amplitudes on the reinforcing structure 7 and this has the opposing tendency to cause the airship 1 to rock toward the side on which the reservoir is raised up, thus compensating for the effect of the crosswind.

This embodiment has numerous advantages.

The reservoir cables 18a, 18b react the forces of the front feet 6a, 6b so that the front arms 8a, 8b are stronger and more lightweight.

The front arms 8a, 8b can be longer, so that the front feet 6a, 6b can be laterally separated by a greater distance D. The airship 1 is therefore better able to withstand a crosswind.

Further, increasing the distance D and using liquid in the reservoirs rather than air in the floats means that the size of these feet can be reduced. These feet thus offer less resistance to the forward travel of the airship 1.

The reservoirs 13a, 13b, 13c and 13d are advantageously of lenticular shape having:

an elongate elliptical vertical section so that they have a low coefficient of drag in a direction parallel to the surface and introduce little resistance to the forward travel of the airship 1, and a substantially circular horizontal section so that they have a high coefficient of drag in a direction perpendicular to the surface.

Thanks to these features of the reservoirs, the resistance of the airship to forward travel is low but it is still able to resist the rocking of a crosswind and to damp out the pitching movements and jolts that waves can cause.

In the various embodiments of the invention, the reinforcing structure 7 of the airship allows the air to flow all around the flexible envelope of the airship 1. The reinforcing structure 7 partially surrounds the envelope 2, delimiting a first and second side. The envelope 2 comprises a first surface on the first side and a second surface on the second side. The first and second surfaces of the envelope 2 are flexible and in contact with the flow of air through which the airship 1 is intended to fly.

The envelope 2 therefore has no rigid internal structure and is not covered by a rigid external structure.

This reinforcing structure 7 is a kind of frame having an opening through which the envelope 2 passes and which delimits said first and second sides. This reinforcing structure 7 is designed to hold the envelope 2 inside this opening, using means of attachment.

The reinforcing structure 7 does not pass through the envelope 2, and the envelope 2 does not have a rigid internal structure.

The reinforcing structure 7 does not cover the envelope 2: it does not cover it over an extended area. Most of the external surface of the flexible envelope 2, for example 80% of this surface, is in contact with the flow of air. The reinforcing structure 7 is therefore not an enveloping structure. For example, it has an annular shape around the envelope 2.

The reinforcing structure 7 is possibly some distance away from the flexible envelope 2, with no contact therewith, the means of attachment 9 making the connection between the reinforcing structure 7 and the envelope 2.

The reinforcing structure 7 according to the invention does not correspond to a structure of a semi-rigid or rigid airship.

A plurality of points of attachment distributed along the reinforcing structure 7 are, for example, connected by cables to the means of attachment 9 distributed over the outside of the envelope 2, in a curve corresponding substantially to the horizontal projection of the reinforcing structure 7 onto the envelope 2. Because the reinforcing structure 7 surrounds the envelope 2, the curve has a long curvilinear length and forces between the envelope 2 and the reinforcing structure 7 are better distributed over the surface of the envelope.

These means of attachment 9 may be positioned on the envelope 2 substantially in register and/or in alternance with the points of attachment of the reinforcing structure 7. They may equally be placed substantially above and/or below the curve of projection of the reinforcing structure 7. Thus, the reinforcing structure 7 is connected to a larger area of the envelope 2 and the load is better distributed over the envelope.

The reinforcing structure 7 allows the flexible envelope 2 to be connected to the gondola 3, reacts the load of the feet, holds the envelope and prevents deformation of the envelope. It is lightweight and inexpensive.

Further, the airship may comprise a substantially horizontal longitudinal arm 10*a* (FIG. 8) extending from the gondola 3 toward the nose 2*a* of the airship. This longitudinal arm 10*a* may potentially be telescopic so as to have an end distal from the gondola, the position of which is somewhere between the gondola 3 and a position substantially vertically aligned with the nose 2*a*.

This longitudinal arm 10*a* is designed to deploy a mooring cable 10 between the distal end of said arm and a substantially fixed mooring point 11 of the surface. The airship 1 is then held near the mooring point 11 when set down on the surface.

Thanks to this mooring means, the airship 1 can be set down fixedly on the surface. The action of the wind on the envelope 2 of the airship tensions the mooring cable 10, and orients the longitudinal axis AX of the airship 1 in the direction of the wind.

A longitudinal arm 10*a* of short length, less than the distance between the gondola and the vertical through the nose 2*a* is easier to produce, better able to withstand load, and allows the airship 1 to have a short rotation radius. However, the action of a crosswind on the envelope is partially reduced because of the portion of surface area of envelope situated forward of the distal end of said longitudinal arm 10*a*.

A longitudinal arm 10*a* of a length such that the distal end of the arm is substantially vertically aligned with the nose 2*a* allows all of the action of the wind to be used to orient the airship 1, with a rotation radius longer than in the previous instance.

In both instances, the airship 1 rapidly positions itself in the direction of the wind and experiences the action of a crosswind for only a brief duration, thus avoiding rocking.

The invention claimed is:

1. An airship intended to fly through the air and to be set down on a solid or liquid surface, comprising:
    a flexible envelope with no rigid internal structure and containing a gas lighter than air, said envelope being elongated substantially along a longitudinal axis between a nose situated toward a front of said airship and a tail situated toward a rear of said airship, and comprising an upper part and a lower part, and
    a gondola situated under the lower part of the envelope between the nose and the tail,
characterized in that the airship further comprises:
    at least three feet spaced horizontally apart and designed for setting the airship down on the surface,
    a reinforcing structure disposed outside of and connected to the envelope above and below the longitudinal axis of the envelope, the reinforcing structure at least partially surrounding the envelope and the longitudinal axis of the envelope for holding the envelope and thereby delimiting a first side and a second side of the envelope, and
    a landing structure disposed outside of the envelope and connecting the at least three feet and the gondola and to the reinforcing structure,
    the envelope comprising a first surface on the first side of the envelope and a second surface on the second side of the envelope, the first and second surfaces of the envelope being flexible and in contact with a flow of the air through which the airship is intended to fly.

2. The airship as claimed in claim 1, in which the landing structure further comprises:
    crossmembers connecting the gondola to said reinforcing structure.

3. The airship as claimed in claim 2, in which the reinforcing structure has a shape chosen from an annular shape, a semi-annular shape and a curved shape.

4. The airship as claimed in claim 2, in which the reinforcing structure comprises at least one first portion above a horizontal median plane passing through the longitudinal axis and a second portion below said horizontal median plane.

5. The airship as claimed in claim 4, in which said first portion is near the nose of the envelope.

6. The airship as claimed in claim 2, in which the reinforcing structure is made up of a curved beam produced as a single piece.

7. The airship as claimed in claim 2, in which the reinforcing structure is constructed using at least one of the materials from a list comprising aluminum, carbon, magnesium, titanium, steel, fiberglass, a synthetic material, a polymer, wood.

8. The airship as claimed in claim 2, in which the landing structure further comprises a plurality of arms, each of said plurality of arms extending downward from a first end that is fixed to the reinforcing structure to a second end, each second end comprising one of said at least three feet designed for setting the airship down on the surface.

9. The airship as claimed in claim 8, further comprising a mooring cable designed to extend forward between a nose portion of the reinforcing structure and a substantially fixed mooring point of the surface designed to hold the airship near the mooring point when said airship is set down on the surface, and in which at least one of the arms resists a pulling force in the mooring cable.

10. The airship as claimed in claim 1, in which each foot is equipped with a float designed so that the airship can be set down on a liquid surface.

11. The airship as claimed in claim 1, further comprising a plurality of orientable propulsion units, and in which at least one of the propulsion units is orientable about two control axes that are perpendicular to and offset from each other so that said propulsion unit can be oriented in any direction.

* * * * *